(No Model.)
T. FALES.
SPEAKING TUBE.
No. 604,694.  Patented May 24, 1898.
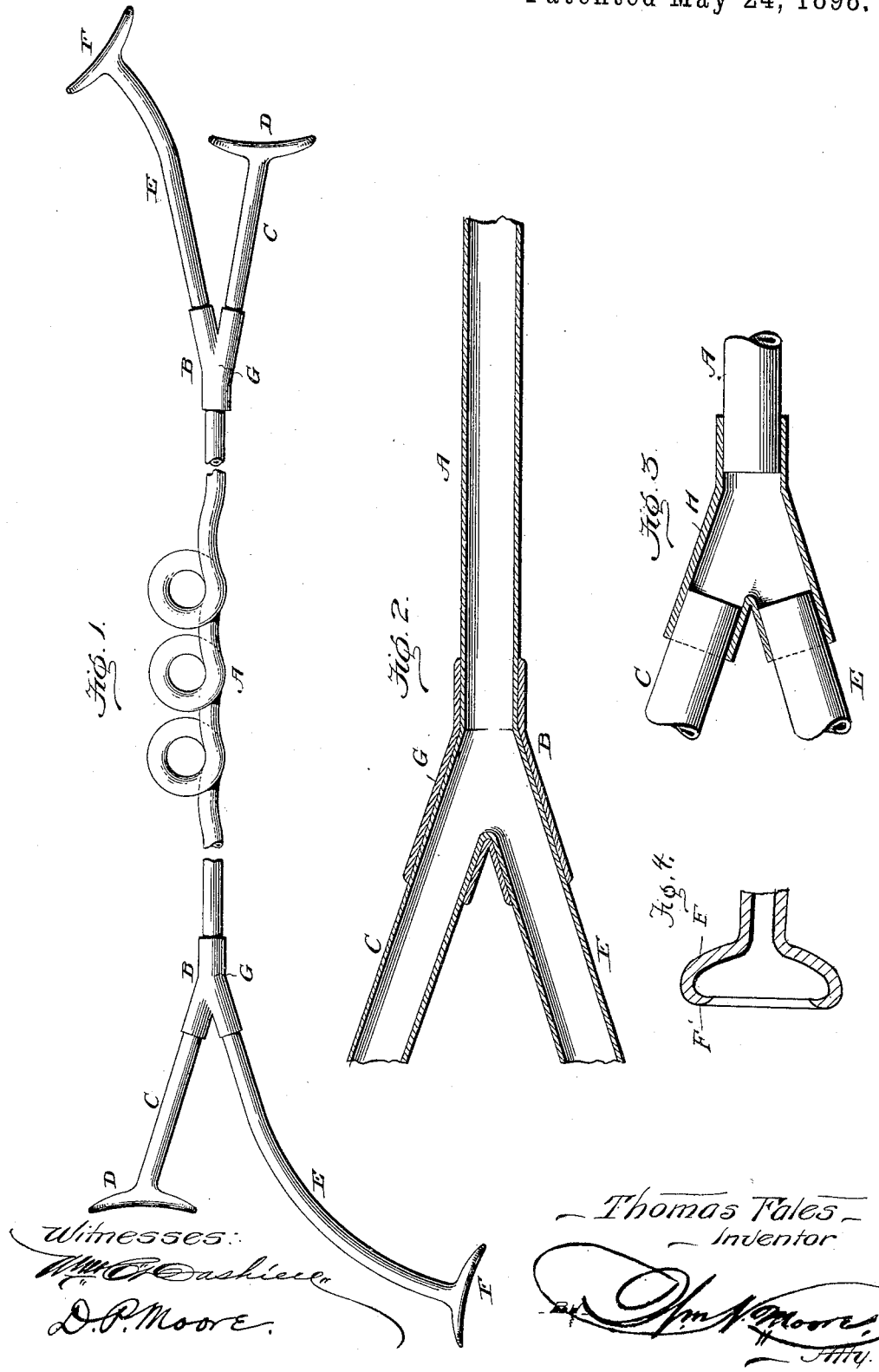
Witnesses:
Wm. C. Dashiell
D. P. Moore
Thomas Fales
Inventor
Wm N. Moore
Atty.
THE NORRIS PETERS CO., PHOTO-LITHO., WASHINGTON, D. C.

UNITED STATES PATENT OFFICE.

THOMAS FALES, OF BRIDGEPORT, CALIFORNIA, ASSIGNOR OF ONE-HALF TO GEORGE J. THACKARY, OF SAME PLACE.

SPEAKING-TUBE.

SPECIFICATION forming part of Letters Patent No. 604,694, dated May 24, 1898.

Application filed July 29, 1897. Serial No. 646,365. (No model.)

*To all whom it may concern:*

Be it known that I, THOMAS FALES, a citizen of the United States, residing at Bridgeport, in the county of Mono and State of California, have invented certain new and useful Improvements in Speaking-Tubes; and I do hereby declare the following to be a full, clear, and exact description of the invention, such as will enable others skilled in the art to which it appertains to make and use the same.

My invention relates to an improved combined speaking-tube and ear-trumpet; and one object of my invention is the provision of a device of this character which will permit of secret or private conversation being conducted between two persons in order that the conversation may be easily imparted from one to the other without disturbing others near by.

Another object of my invention is the provision of a device of this character which will closely fit one ear of each party and bring the mouthpiece in close proximity with the mouth and which will be yielding and accommodate itself according to the distance between the parties or movements thereof without danger of detachment.

Another object of my invention is the provision of a device of the character named which will be simple, inexpensive, and thoroughly efficient and practical for the intended purpose.

The invention consists of a combined speaking-tube and ear-trumpet embodying novel features of construction and arrangement of parts, substantially as disclosed herein.

Figure 1 represents a view in elevation, showing the invention in position for use; and Fig. 2 represents a sectional view of the device. Fig. 3 represents a detail view of one form of splice for forming the fork in the tube. Fig. 4 represents a sectional view of my improved ear-covering.

In the drawings, A designates the body or central portion of the tube, which may be formed in a series of coils and is preferably made of rubber or flexible material, which is forked at B, forming the short branch tubes C, having the cup-shaped mouthpiece D, and with the long branch tubes E, having the earpieces F, which are made, preferably, of elastic material and are adapted to closely fit around and entirely inclose the ear by means of the lap edges or lobes F'. If desired, the tube may have the branches formed integral therewith and provided with a reinforcing-covering G, which is placed in position before the ear or mouth coverings are secured or vulcanized to the ends of their respective forks, or I may use the forked coupling H, (shown in Fig. 3,) to which may be connected the ends of the tube and branches, as is evident.

The manner of using my device is obvious, and it will be seen from Fig. 1 that the coverings closely fit the ear of each party and the mouthpieces naturally come into position with the mouth and a conversation can be conducted between two parties without disturbing others, and also that movement of the head of the parties will be accommodated by reason of the coils.

The advantages of my device are many, and among them may be noted the desirability of the device in theaters, churches, and other places where it is necessary to converse without disturbing others. Also where it is necessary to hold private conversation the device would be invaluable.

I claim—

1. A combined speaking-tube and ear-trumpet, consisting of the extensible body portion having each end formed with two branch pipes leading to the ear and mouth respectively, the mouth-pipe being provided with a mouthpiece and the ear-tube being provided with an ear-covering which will closely surround the ear, and hold the said covering upon the ear without the aid of the hand.

2. A combined speaking-tube and ear-trumpet, consisting of the body portion having each end forked to provide two branches, one leading to the mouth and the other to the ear, mouthpieces carried by the mouth branches and ear-covers carried by the ear branches, said covers being of elastic material to permit them to cover and snugly fit the ears, and hold the said ear-covering upon the ear without the aid of the hand.

3. A combined speaking-tube and ear-trumpet, consisting of the body portion and forked ends made in one piece of material, mouth and ear pieces carried by the forked ends and having flaring mouths to cover the ears and mouths of the users, said ear-covering adapted to surround the ear and be held therearound without the aid of the hand, and a forked reinforcement adapted to surround the body portion and ends of the forked branches where the said body portion and forked branches meet.

4. A speaking-tube, consisting of the conducting-tube, said tube terminating in the forked reinforced ends, two of the said forked ends carrying a mouthpiece, and the other two being of greater length and carrying each an ear-covering adapted to fit over the ear of the user and be held therearound without the aid of the user's hand.

In testimony whereof I affix my signature in presence of two witnesses.

THOMAS FALES.

Witnesses:
GEORGE J. THACKARA,
MINNIE PIMENTEL.